United States Patent [19]

Foreman

[11] Patent Number: 5,069,243

[45] Date of Patent: Dec. 3, 1991

[54] LIQUID LEVEL CONTROL SYSTEM

[75] Inventor: Brain E. Foreman, Norwich, United Kingdom

[73] Assignee: Euro Iseki Limited, England

[21] Appl. No.: 411,507

[22] PCT Filed: Feb. 3, 1989

[86] PCT No.: PCT/GB89/00107

§ 371 Date: Nov. 30, 1989

§ 102(e) Date: Nov. 30, 1989

[87] PCT Pub. No.: WO89/07293

PCT Pub. Date: Aug. 10, 1989

[30] Foreign Application Priority Data

Feb. 4, 1988 [GB] United Kingdom ............... 8802562
Aug. 31, 1988 [GB] United Kingdom ............... 8820614

[51] Int. Cl.$^5$ .................... E03F 1/00; B65G 53/00; F16K 31/126

[52] U.S. Cl. .................... 137/205; 4/323; 137/236.1; 137/393; 137/396; 137/403; 141/65; 141/198; 406/14; 406/192

[58] Field of Search .............. 4/316, 323, 380, 431, 4/434; 137/205, 236.1, 386, 393, 395, 396, 403, 413, 414, 523, 846; 251/4, 5, 6, 7, 28, 61.2, 61.4, 61.5; 406/14, 15, 30, 50, 115, 192; 141/65, 198; 222/66

[56] References Cited

U.S. PATENT DOCUMENTS

| | | | |
|---|---|---|---|
| 3,628,194 | 12/1971 | Liljendahl | 137/236.1 |
| 3,777,778 | 12/1973 | Janu | 137/487.5 |
| 3,853,138 | 12/1974 | Amren | 137/205 |
| 3,998,736 | 12/1976 | Greenleaf, Jr. | 137/396 |
| 4,062,377 | 12/1977 | Ward | 137/523 |
| 4,179,371 | 12/1979 | Foreman et al. | 137/236.1 |
| 4,188,968 | 2/1980 | Trobaugh et al. | 137/236.1 |
| 4,373,838 | 2/1983 | Foreman et al. | 137/236.1 |
| 4,603,709 | 8/1986 | Huisma | 137/205 |
| 4,691,731 | 9/1987 | Grooms et al. | 137/236.1 |

FOREIGN PATENT DOCUMENTS

3011502 10/1980 Fed. Rep. of Germany.
2149534 6/1985 United Kingdom.

Primary Examiner—George L. Walton
Attorney, Agent, or Firm—Neal J. Mosely

[57] ABSTRACT

A liquid level valve control system includes pressure responsive means compring a first chamber containing a first diaphragm having a port for applying pressure; bleed means enabling air to pass this diaphragm; and passageway means enabling air then to pass into a further chamber also containing a diaphragm operatively linked to the valve operating apparatus; so that, when a predetermined and substantially constant pressure is applied at the port, air bleeds past the first diaphragm into the further chamber to move the diaphragm therein to activate the valve control system, but when a surge of pressure is applied at the port the first diaphragm moves to block the passageway into the further chamber, thus preventing pressure being applied to the latter's diaphragm to activate the valve control system. The invention also suggests a secondary valve of a kind, known per se, in which a "pinching" pressure across the valve's flexible body flexes one or more sealing member inside the body to close the valve, while the application of a force perpendicular to the body's surface flexes the or each sealing member to open the valve.

20 Claims, 8 Drawing Sheets

LIQUID LEVEL CONTROL SYSTEM

FIELD OF THE INVENTION

This invention relates to liquid level control systems, and concerns in particular the control of the level of the liquid in temporary storage and transportation systems such as are often found in sewage systems.

REVIEW OF THE PRIOR ART (1)

In a number of fields, including that of sewage collection and disposal, liquid is transported along a pipe from one place (a reservoir of liquid) to another by reduced pressure, or vacuum, applied at the delivery end of the pipe causing ambient pressure in the reservoir, or tank, into which the other end of the pipe projects to force the liquid into and along the pipe. A typical set-up employed in the collection of sewage uses, as a temporary liquid store, a tank having an inlet by which liquid may be fed into the tank and an outlet by which liquid may be withdrawn from the tank, the outlet being connected to a vacuum source via a primary, or interface, valve. This interface valve has a valve control system operating in such a way that in use it opens the valve when the tank fills up (when the liquid in the tank reaches a first predetermined level), allowing the applied vacuum to "suck" the liquid in the tank out via the outlet until the tank is empty (the level of liquid left in the tank has dropped to another, lower, predetermined value), at which the control system shuts off the valve.

In general, the Art of collecting liquids, including sewage, by vacuum is well-known, and various Patents relating thereto have been issued over the past 100 years to Liernur, Le Marchand, Liljendahl, Foreman and Jones, et al. One particular facet of the Art involves the necessary vacuum interface valve control system, and a number of these are documented in U.S. Pat. Nos. 3,777,778 (Janu) and 4,373,838 (Foreman and Grooms), and UK Patent No. 2,149,534 (Sykes). The present invention concerns control of the interface valve.

These prior art valve control systems, sometimes known as liquid level control systems, have generally been constructed from many intricate parts, requiring frequent and costly maintenance (for example, shaft seals). In addition, some of the previous vacuum liquid transport systems experience a problem when the vacuum used to transport the liquid drops to a dangerously low level. It arises in the following manner.

Because vacuum liquid transport systems work on the principle of differential pressure between the atmospheric air and the vacuum in the collector pipe, it follows that the higher the vacuum in the collector pipe the higher will be the transport velocity of the liquid. Now, in an emergency situation, such as if one or more vacuum interface valve were to jam open, the vacuum in the collector pipe would drop to a low level. Were the other vacuum valves in the transport system to be allowed to continue to operate automatically at this low vacuum level, the velocity of the liquid in the collector pipe would drop, and the pipe would quickly fill completely. Once the pipe fills with the liquid the energy available from the vacuum pressure is quickly used up in friction losses, and liquid transport stops. This situation is known as "waterlogging", or "bog down", and the possibility of it occurring can be reduced if the interface valve control system is modified to close the valve, so preventing the ingress of further liquid, when the vacuum level drops below some threshold value.

The invention proposes that this be achieved by incorporating into the interface valve control system a secondary valve that is itself vacuum operated—and that, indeed, is actuated by the same vacuum as is applied to the liquid storage tank—the arrangement being such that, if the actuating vacuum drops significantly then the secondary valve operates to close the primary, interface, valve, thus preventing further liquid being drawn into the transport system's collecting pipe, and thus obviating, or at least reducing, the risk of the pipe becoming filled with liquid.

More specifically, the invention suggests that a valve control system for use in a temporary liquid storage and transportation system of the type wherein a tank having an inlet also has an outlet connected to a vacuum source via an interface valve, and operating to open that interface valve when the liquid in the tank reaches a predetermined level, should include a secondary valve of a kind, known per se, in which a pressure differential between the ends of the valve's flexible body flexes one or more sealing member inside the body to close the valve, whilst the application of a force perpendicular to the body's surface flexes the or each sealing member to open the valve.

SUMMARY OF THE INVENTION (1)

In one aspect, therefore, the invention provides a control system for use with a primary, or interface, vacuum-operated valve, which control system includes a secondary valve, for connecting a vacuum source to the interface valve, which is of a type having a through-passageway body with a valve member mounted therewithin actuated by an across-valve pressure differential, the body being flexible such that under an applied perpendicular force it deforms, whereby the valve member fails to seat properly and so the secondary valve becomes in effect open.

More particularly, the invention provides a valve control system for use in a temporary liquid storage and transportation system of the type including a tank having an inlet and an outlet by which liquid may respectively be fed into and withdrawn from the tank, the outlet being connectable to a vacuum source via a primary, or interface, vacuum-operated valve controlled by the valve control system in such a way that in use the system operates to open the interface valve when the liquid in the tank reaches a predetermined level, wherein the valve control system includes a secondary valve operative to connect a vacuum source to, and thus open, the interface valve, which secondary valve is of a type having a flexible hollow tubular body, constituting a through passageway, with a valve member mounted therewithin so as to block the passageway under the influence of an across-valve pressure differential in one direction but not the other, and thus to close the valve, the body being resiliently flexible such that under an applied axially-normal force it reversibly deforms and the valve member, though closed, fails to seat properly, whereby the valve becomes in effect open.

The temporary liquid storage tank, with its inlet and outlet (the latter connectable to a vacuum source by which liquid in the tank may be withdrawn therefrom) in general may be of any suitable type, and no more need be said about it here, except to note that one particular example is described hereinafter with reference to the accompanying Drawings.

The primary, or interface, valve may be of any convenient vacuum-operated variety. It may, for example, incorporate a chamber-contained piston or diaphragm connected to actuate the valve member itself, which piston or diaphragm moves within its chamber as a result of the pressure differential thereacross when vacuum (or reduced pressure) is applied to one side and air (ambient pressure) is applied to the other. It is the application of this vacuum that is controlled by the valve control system of the invention.

The interface valve control system may employ a timer to provide the main control over how long the interface valve is kept open (and thus the vacuum is applied to the temporary liquid storage tank to withdraw liquid therefrom). Alternatively, or in addition, it may be arranged that the system be responsive to the liquid level in the tank not only to initiate valve opening (when the level reaches a first, high, predetermined value) but also to initiate valve closing (when the level thereafter drops to a second, low, predetermined value). The level responsive apparatus conveniently involves a pressure sensor system, one variety of which is described hereinafter with reference to the accompanying Drawings, that detects and responds to the pressure of air trapped in the upper end of a stand pipe in the storage tank; as the liquid level rises or falls, so the pressure of the trapped air correspondingly rises or falls, and can be used to initiate opening or closing of the interface valve.

The secondary valve is of a type, known per se, having a flexible tubular body, preferably of elongate form and circular cross-section, with a valve member mounted therewithin (rather like a flap valve) to control the flow of fluid (in this case, air) therethrough. Normally the valve (flap), under the influence of a pressure differential across the valve in the appropriate direction, blocks (seals) the tube, and so closes the valve, by sealing onto its seating within and across the body. However, because the body is resiliently flexible—made, for instance, of rubber or a like material—it can be deformed by an applied "pinching" pressure perpendicular (axially normal) thereto in such a way that the valve member and its seating deform to prevent this sealing closure. Thus, even though the applied pressure differential is sufficient to close the valve, the deformation caused by the simultaneously-applied pinching force keeps the valve open.

A particularly preferred form of secondary valve is that known as a "duckbill" valve, in which there are two flap-like valve members that project towards the upstream end of the valve and into "sealing" contact one against the other (the two together look rather like a duck's bill, hence the name). An embodiment of control system using such a valve is described in more detail hereinafter with reference to the accompanying Drawings.

REVIEW OF THE PRIOR ART (2)

In certain embodiments of the type of temporary liquid storage and transportation system with which the invention is concerned the storage tank itself may be sealed to atmosphere apart from its inlet and outlet (to which the liquid is fed thereto and withdrawn therefrom). Under these circumstances it is possible that, when the interface valve to the outlet is suddenly closed at the end of a withdrawal-of-liquid cycle, the rush of liquid and air still entering the tank may result in a sudden increase in the pressure within the tank. This may, in turn, mimic the pressure usually experienced by the level sensing apparatus only when the liquid level in the tank reaches the first (high) predetermined value—with the result that the apparatus triggers the re-opening of the interface valve despite the fact that the valve has only just closed because the actual level had reached the second (low) predetermined value. The invention now proposes that this possibility be obviated by incorporating into the level sensing apparatus means to prevent a sudden surge in pressure resulting in the operation of the interface valve control system to initiate opening of the interface valve. More specifically, the invention suggests that a valve control system for use in a temporary liquid storage and transportation system of the type described hereinbefore should include pressure responsive means comprising: a first chamber containing a first diaphragm having a port for applying pressure; bleed means enabling air to pass this diaphragm; and passageway means enabling air then to pass into a further chamber also containing a diaphragm operatively linked to the valve operating apparatus; so that, when a predetermined and substantially constant pressure is applied at the port, air bleeds past the first diaphragm into the further chamber to move the diaphragm therein to activate the valve control system, but when a surge of pressure is applied at the port the first diaphragm moves to block the passageway into the further chamber, thus preventing pressure being applied to the latter's diaphragm to activate the valve control system.

SUMMARY OF THE INVENTION (2)

In a second aspect, therefore, the invention provides a valve control system for use in a temporary liquid storage and transportation system of the type wherein a tank having an inlet also has an outlet connected to a vacuum source via an interface valve, and operating to open that interface valve when the liquid in the tank reaches a predetermined level, which control system includes pressure responsive means comprising:

a first chamber which contains a first diaphragm disposed thereacross, and which communicates with a port at which air pressure may be applied;

means enabling air to pass from an area in front of to an area behind the first diaphragm; and passageway means enabling air from the latter area to pass into a second chamber which contains a second diaphragm disposed thereacross and operatively linked to the valve operating apparatus;

the arrangement being such that, when a predetermined and substantially constant pressure is applied at the port, air from the first chamber's first area passes through to its second area, and thence to the second chamber to apply pressure to, and so move, the second diaphragm, causing the activation of the valve control system, but when a surge of pressure is applied at the port the air pressure acting on the first diaphragm causes the latter to move so as to block the passageway into the second chamber, thus preventing pressure being applied to the second diaphragm, and so preventing activation of the valve control system.

The tank, and its interface valve, may conveniently be as the preferred embodiments described hereinbefore.

The means enabling air to pass (bleed) from one side of the first chamber's diaphragm to the other is conveniently a small hole, or orifice, in the diaphragm itself (towards the edge thereof), so that air on the front side can slowly leak through to the rear side. Naturally, though, the orifice must be a sufficiently small size that a sudden and substantial increase in air pressure at the sensor port causes the air in the front side volume to pressurize, and move the diaphragm (to block the passageway), rather than merely to leak away.

The two chambers are preferably physically adjacent and aligned, sharing a common wall in which is the passageway joining them. Most conveniently this passageway can be physically blocked by the first diaphragm seating on, and sealing, the opening thereinto at one extreme of its range of movement (when under substantial pressure applied at the port to the first chamber).

Movement of the second, or further, chamber's diaphragm actuates the interface valve control system. As described hereinafter with reference to the accompanying Drawings, this is conveniently achieved by the diaphragm physically contacting, and driving, a plunger slidably mounted within, and extending out from, the second chamber into operating contact with the control system. In this case the control system may include a "duckbill" secondary valve (as used in that control system constituting the first aspect of this invention), and it may be this plunger which, driven by the second diaphragm, applies the lateral force to the duckbill valve's body to deform, and so open, the valve (allowing vacuum to be supplied to the interface valve). Another possibility, however, is to use a "snap action switch" secondary valve, the plunger bearing on, and operating, the switch portion thereof to open the valve, etc. The use of such a "snap action switch" secondary valve is also described hereinafter with reference to the accompanying Drawings.

Naturally, the invention extends to any liquid storage and transportation system using an inventive interface valve control system as described and claimed herein.

BRIEF DESCRIPTION OF THE DRAWINGS

Various embodiments of the invention are now described, though only by way of illustration, with reference to the accompanying Drawings, in which.

Figure 1:
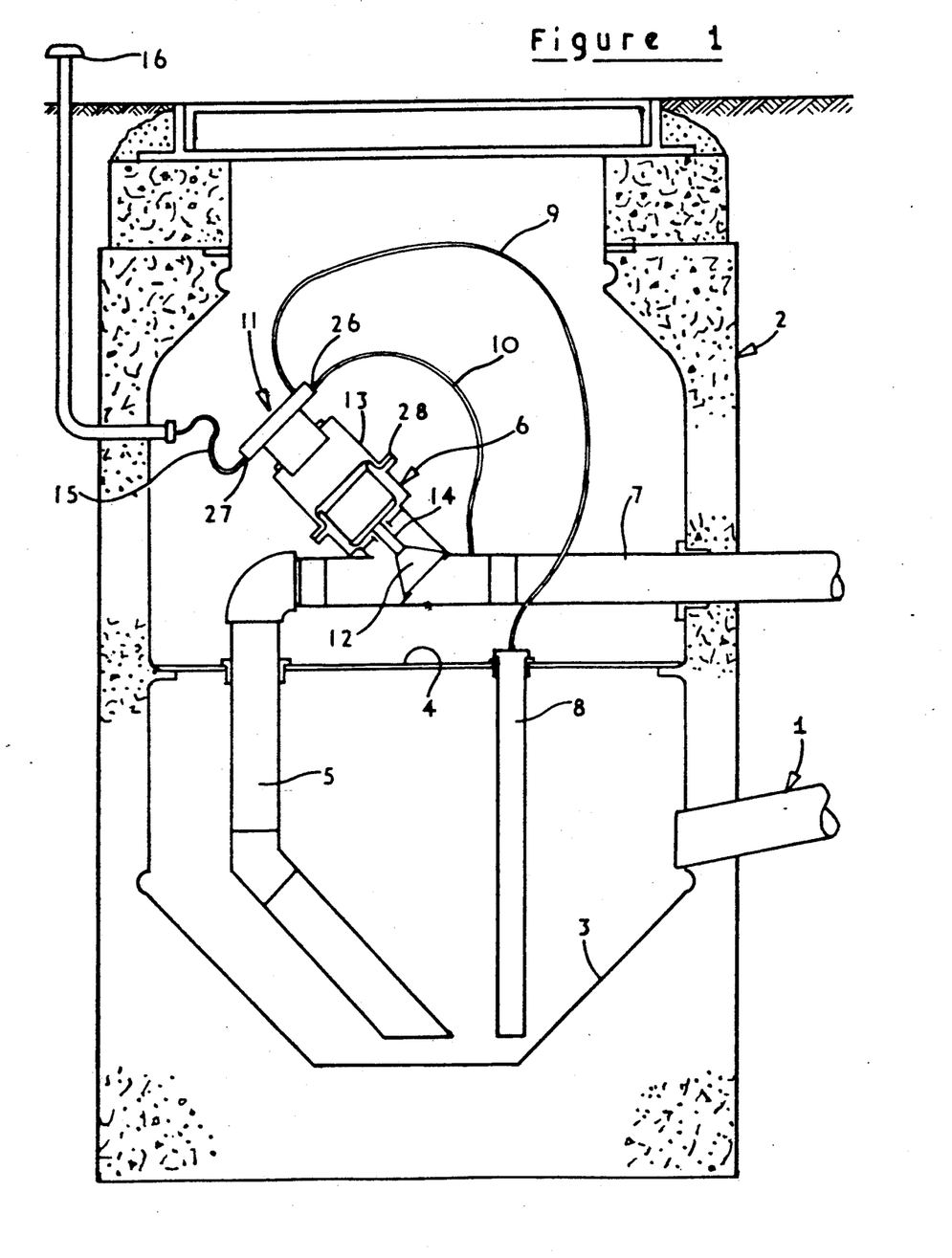
FIG. 1 is a cutaway view of a temporary liquid storage and transportation system which incorporates a valve control system according to the invention.

The temporary liquid storage system shown in FIG. 1, which may be located above or below ground, comprises at least one gravity collector pipe 1 which opens into a small sump 3 defined by the lower half of a tank 2 and a floor 4. A vacuum suction pipe 5 also opens into the sump 3, and is connected to a vacuum collector pipe 7 via a vacuum interface valve 6. The collector pipe 7 is connected to a vacuum source (not shown) located outside the tank 2.

Figure 3:
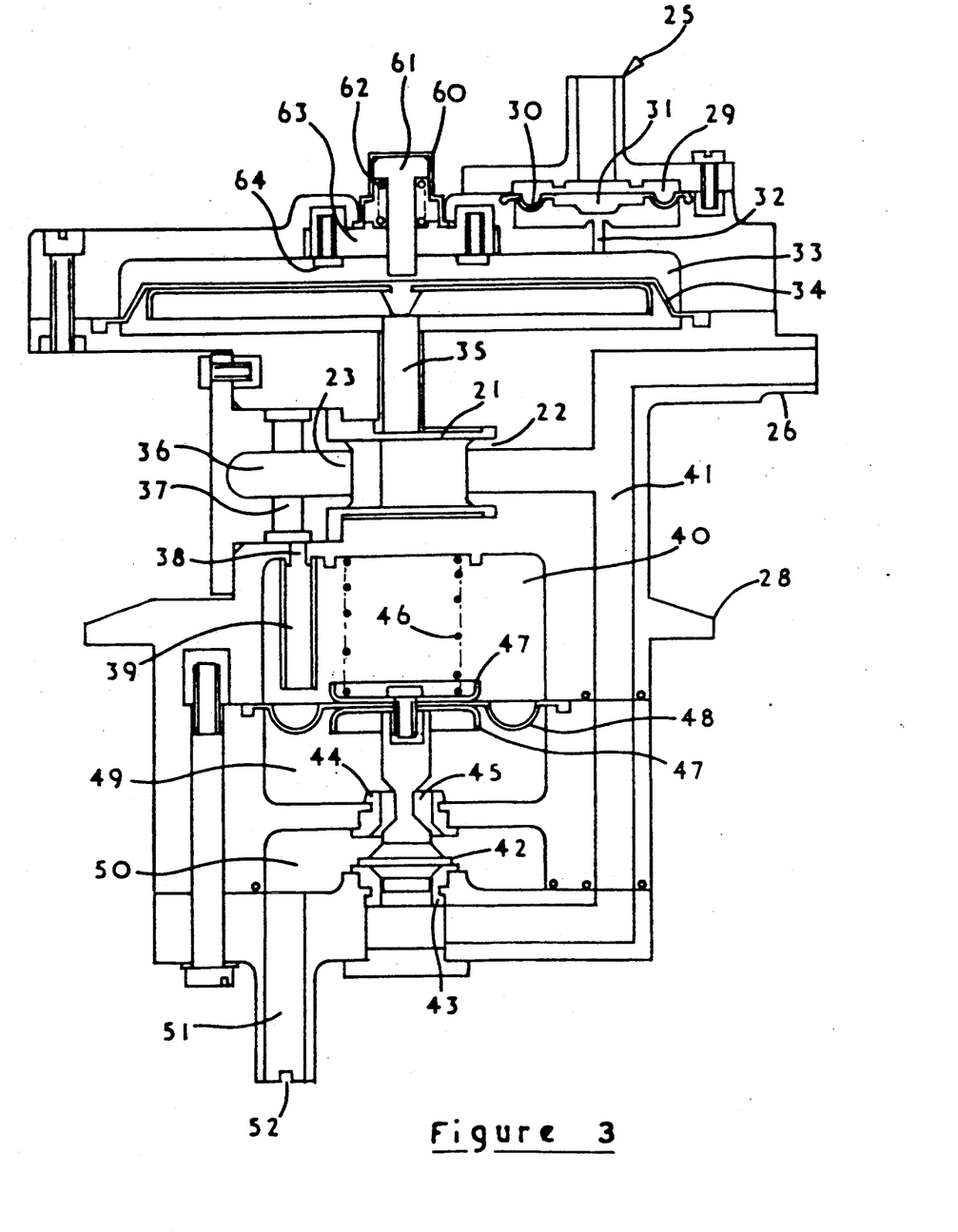
FIG. 3 is a cross section through the valve control system along the line C—C in FIG. 2.

The vacuum interface valve 6, which comprises a movable plunger 12 connected to a rolling diaphragm operator 13 by a shaft 14, is attached to a valve control system (generally 11) by a flange 28 (see FIG. 3). The control system 11 is supplied with vacuum by a hose 10 which passes from the valve 6 (downstream of plunger 12) to the vacuum port 26 (shown in FIG. 3). The control system 11 also has an atmospheric port 27 (see FIG. 5), which communicates with the atmosphere via hose 15 and insect screen 16.

A liquid level sensing pipe 8, which is open at its lower end, projects vertically into the sump 3. The other end of the pipe 8 is connected by hose 9 to the level sensing port 25 (shown in FIG. 3) of the control system 11.

Figure 2:
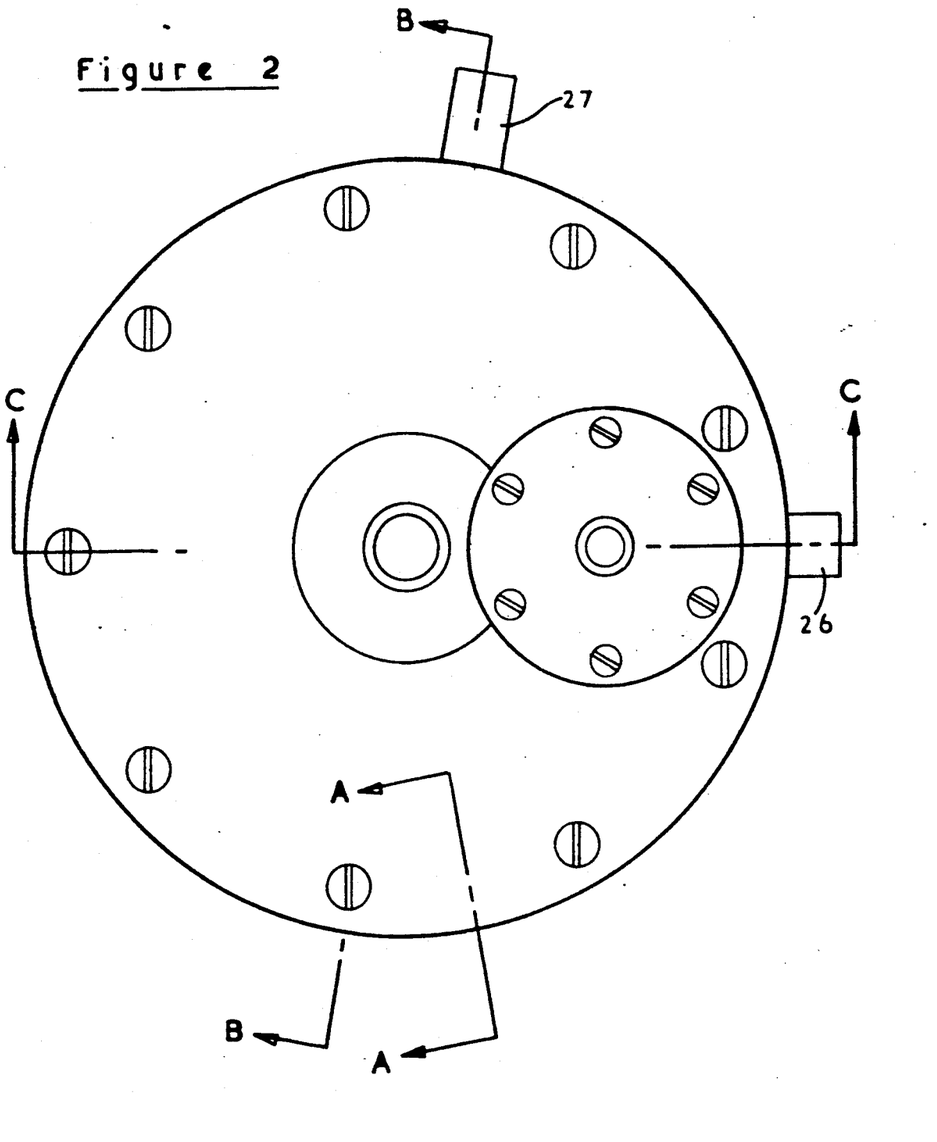
FIG. 2 shows in plan the valve control system.
Figure 6:
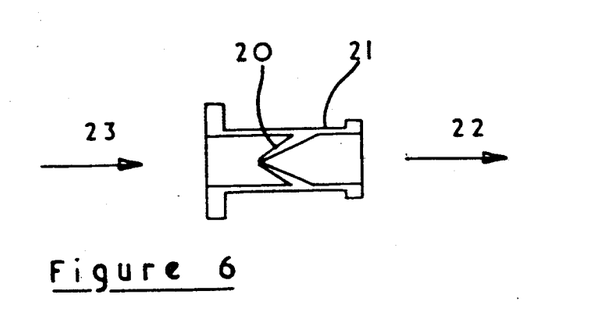
FIGS. 6 and 7 are sectional views taken in horizontal and vertical axial planes respectively of a rubber duckbill valve unit which is used in the valve control system of the invention.
Figure 7:
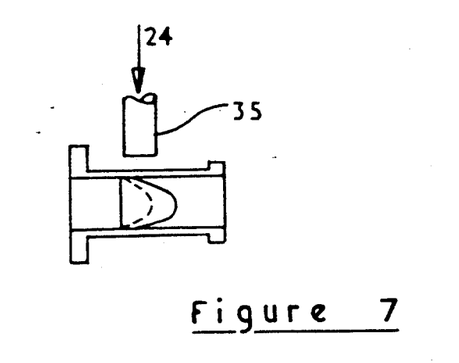

Referring to FIGS. 2 and 3, the level sensing port 25 of the system 11 communicates with a circular chamber 29 which is divided into an upper and a lower portion (as shown) by a soft rubber circular diaphragm 31. The diaphragm 31 has a small orifice 30 near its edge which enables air to leak from the upper (front) to the lower (rear) portion of the chamber 29. A passageway 32 connects the lower (rear) portion of the chamber 29 to a second circular chamber 33, which houses a second circular diaphragm 34. The cavity immediately below diaphragm 34 communicates with the atmosphere through passageway 53 and port 27 (see FIG. 5). The underside of diaphragm 34 makes contact with plunger 35, which in turn bears against a flanged elastomer sleeve 21 in which a tubular elastomer "duckbill" or reed type valve 30 is enclosed (see also FIGS. 6 and 7). With vacuum applied to side 22 of the duckbill 20 and atmospheric pressure to side 23, the duckbill remains closed. However, applying "pinching" pressure (in the direction indicated by arrow 24) to the outside of the sleeve (as shown in FIG. 6) deforms the sleeve, prevents the flaps of the duckbill sealing one on the other, and so opens the valve, allowing the vacuum to pass through the valve until the applied pressure is removed, resulting in the valve 20 closing.

The side 22 of the duckbill valve unit is connected to a passageway 41 which is in turn connected to the vacuum port 26. The opposite side 23 of the unit communicates with a cylindrical chamber 40 through passageways 36, 37 and 38, and tube 39.

Passageways 55 and 58 (shown only in FIG. 4) allow air to flow from the cavity immediately underneath diaphragm 34, through passageways 59 and 57, into the chamber 40 at a rate determined by a screw adjustable needle valve 56 which is interposed between passageway 58 and passageway 59.

The chamber 40 is separated from an adjacent cylindrical chamber 49 by a circular diaphragm 48 which carries a pair of cups 47, one on each opposing face of the diaphragm 48. The upper cup holds the end of a compression spring 46, the other end of which bears against the top of the chamber 40 so biassing the diaphragm 48 downwards. The lower cup 47 is connected to a double-cone valve 42 which is situated in a circular chamber 50, and which, depending on the position of the diaphragm 48, rests against either lower static seal 43 or upper static seal 44.

Figure 5:
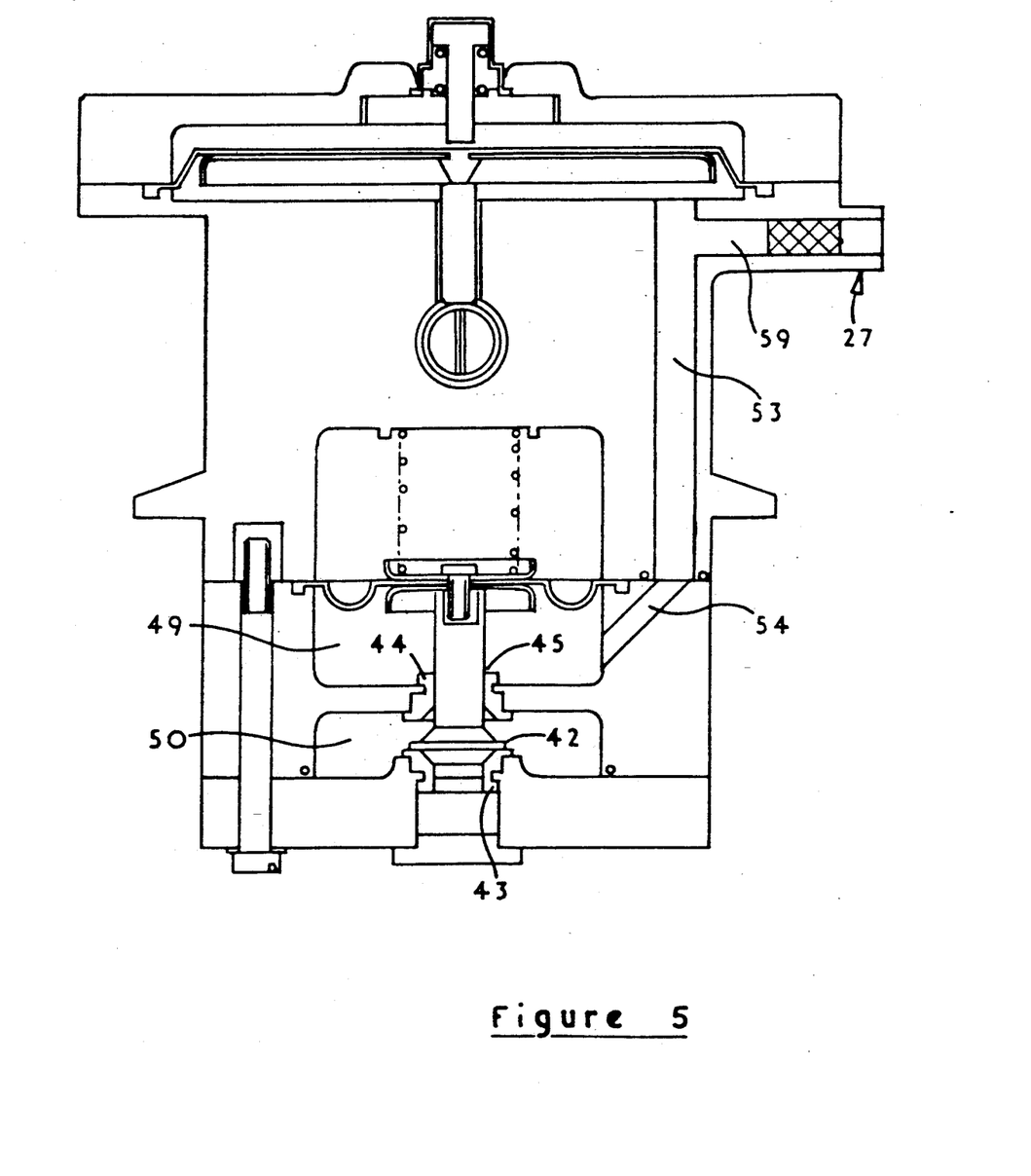
FIG. 5 is a third cross section, along the line B—B in FIG. 2.

The chamber 49 is connected to passageway 53 by passageway 54 (see FIG. 5). With the valve 42 bearing against the lower seal 43, air may pass from the chamber 49 to the chamber 50 through the port 45. The passageway 41 terminates in a cavity immediately below the valve 42. With the valve 42 resting on the seal 44, air may pass from the chamber 50 into the passageway 41.

The chamber 50 communicates with the interface valve 6 through a passageway 51 which incorporates a slot 52.

The general principle of operation of the tank and control system is as follows:

Liquid enters the tank 2 from gravity collector 1. As it does so, the liquid level rises in the sump 3, and creates air pressure in pipe 8 which is communicated by hose 9 to the valve control system 11. Hose 10 supplies vacuum from the vacuum collector to the valve control system 11.

The pressure in hose 9 activates the control system 11, which applies vacuum from hose 10 to the diaphragm of the valve 13, whereupon the valve opens. In a timed system a pneumatic timer in control 11 then starts, and liquid is drawn into the collector pipe 7 through suction pipe 5 until the pre-set time period has expired, when the plunger 12 closes and the control 11 reverts to the standby position.

As just explained, pressure from the rising liquid level in sump 3 is applied through hose 9 and port 25 to chamber 29. With the pressure rising slowly, air bleeds through the small orifice 30 in the soft rubber diaphragm 31, and passes through passageway 32 into chamber 33. Here, the pressure is applied to diaphragm 34 (the air pressure under diaphragm 34 is relieved through passageway 53 and port 27, which connect to the atmosphere), which flexes and applies pressure to plunger 35, which in turn applies a distorting lateral force to sleeve 21. As the force increases the valve opens, and allows vacuum from port 26 to pass therethrough into passageways 36, 37 and 38 and tube 39 into chamber 40.

Vacuum from port 26 is also supplied through passageway 41 to the underside of valve 42, and when valve 42 opens this vacuum is fed to chamber 50 and then via passageway 51 to interface valve 6, as noted above. Normally, however, valve 42 is kept in the closed position by spring 46 acting through cups 47 attached to diaphragm 48, and by the action of the vacuum sucking the valve head against the static seal 43. Spring 46 has its rate selected to prevent valve 42 opening if insufficient vacuum is available at port 26 (and thus in chamber 40) and hence if vacuum available in the collector pipe is insufficient to ensure adequate transport velocity. The rate of spring 46 may require variation from system to system, but will usually allow the valve 42 to open when the vacuum is of the order of 0.25 bar or above (this figure of 0.25 bar is not, of course, definitive).

When vacuum enters chamber 40 through tube 39 any condensation or water that has collected on diaphragm 48 is sucked out, through passageways 38, 37 and 36, valve 21, and port 26, into the vacuum collector pipe. Provided vacuum of sufficient level is available to overcome the force of spring 46 and suction on the valve head 42 through passageway 41, the diaphragm 48 and cups 47 will flex upwards lifting valve 42 off the lower static seal 43 until it is brought to rest against the upper static seal 44. This closes off the chamber 49 from chamber 50, and allows vacuum from passageway 41 to flow into chamber 50 and out through passageway 51 into the upper operator of valve 6 (see FIG. 1), which then opens. When the operator of valve 6 is in its fully open position the lower end of passageway 51 acts as a travel stop for the valve 6 operator. Slot 52 in passageway 51 is designed as a suction breaker to assist valve 6 closure. Any water or condensation that may have collected in the operator of valve 6 is drawn out through passageways 52 and 41, and port 26, into the vacuum collector pipe.

As valve 6 opens vacuum passes through pipe 5, and starts to suck up the contents of the sump 3. When the level of water has dropped sufficiently to reduce the pressure in pipe 8, and hence remove pressure 24 from plunger 35, valve 20 closes by the force of vacuum 22. This leaves valve 20 closed with vacuum in chamber 40 holding valve 42 open. Passageways 55 and 58 are connected to atmosphere through passageway 53 and port 27. Adjustable needle valve 56 supplies atmospheric pressure through passageways 55 and 58 into chamber 40 through passageways 59 and 57. When sufficient atmospheric air has been drawn into chamber 40 the lowering vacuum pressure is insufficient to hold the spring 46 compressed, and valve 42 moves downward away from seal 44 until it seals on seat 43. Atmospheric pressure from port 27 and passageways 53 and 54 passes into chamber 49 and through passageway 45 in valve shaft 42 into chamber 50, and then through passageway 51 into the operator of valve 6, allowing valve 6 to close.

Figure 4:
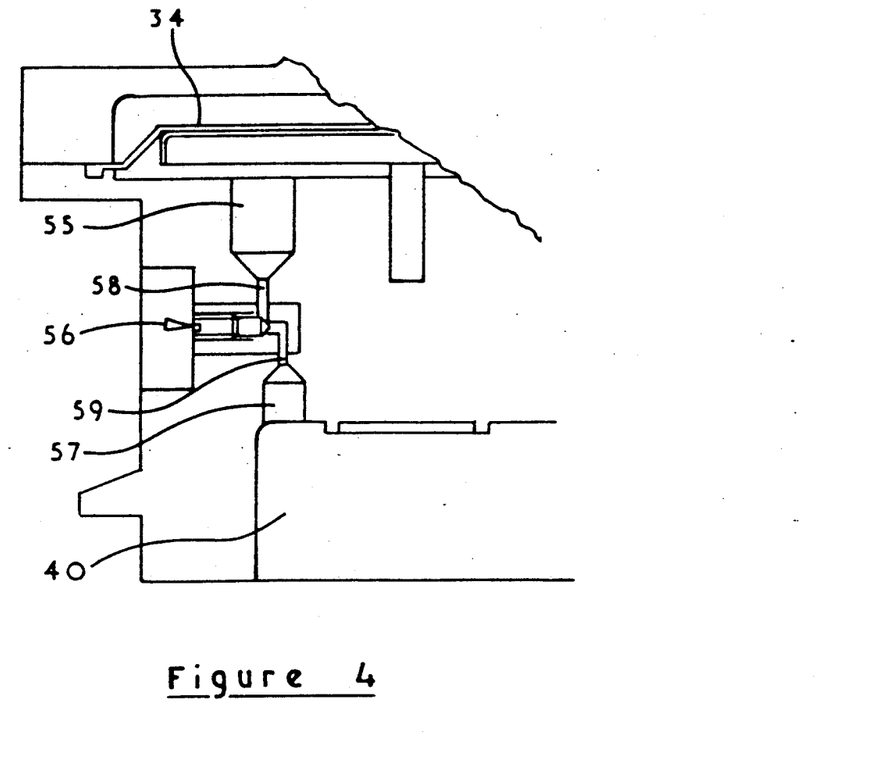
FIG. 4 is a second, partial, cross section, along the line A—A in FIG. 2.

The open time of the valve 42 may be increased or decreased by adjusting the setting of valve 56 with a screwdriver. Hence the open time of the main valve, which controls the air-to-liquid ratio in the vacuum collector pipe, is controlled by valve 56.

The temporary storage tank 2 may be installed in ground having a high water table; hence tube 15 is usually installed above ground, and fitted with an insect screen 16.

In areas with a lot of fine blowing and drifting dust or sand, fitting of a fine filter 59 in the atmospheric port 27 is recommended to reduce the necessary servicing frequency (increase the servicing intervals) of the needle valve 56.

In some instances it may be necessary to provide the temporary storage tank 2 with a sealed cover. In such an installation the large volumes of air drawn through pipe 5 when the valve 6 is open have to be drawn through the gravity collector pipe and the vent pipe. When valve 6 closes the air rushing through gravity collector 1 causes a sudden sharp pressure increase in the sealed tank 2. This increase in pressure is communicated through pipe 8 and hose 9 to port 25 of the valve control system, where it causes diaphragm 31 to seal against port 32, preventing diaphragm 34 from triggering a second cycle of valve 42, and hence main valve 6, which would result in continuous cycling of valve 6.

For test purposes a rolling-diaphragm-sealed push button is provided as shown in FIG. 3. Diaphragm 60 covers and seals push button 61. Spring 62 keeps the push button 61 in the "off" position. Plate 63 held in place by screws 64 both seals and keeps the unit in position.

Finger pressure applied to diaphram 60 pushes the plunger downward, applying pressure to diaphragm 34 which triggers the operation of the valve control system 11.

Figure 8:
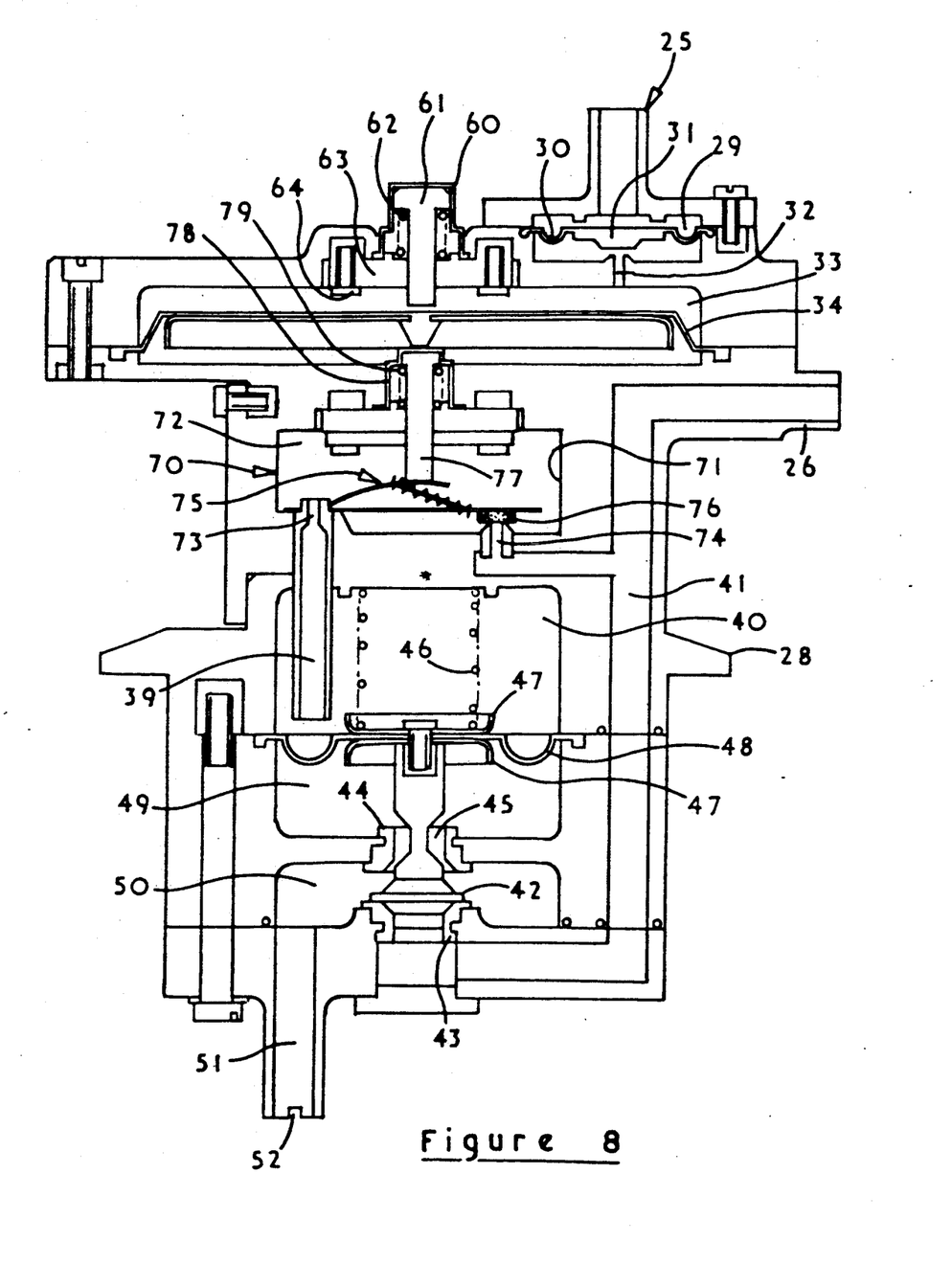
FIG. 8 shows an alternative form of valve control system, and is a view corresponding to that of FIG. 3.

In the case of the system shown in FIG. 8, the duckbill valve is replaced by a snap action switch 70, which is similar to the snap action switch shown in UK Patent Specification No: 2, 149, 534 (Sykes).

Switch 70 is a composite assembly. It includes a casing 71, which defines a chamber 72. A port 73 is formed in the casing 71, and enables the chamber 72 to communicate with the chamber 40 via the tube 39. A port 74 is also formed in the casing 71, and is connected to the passageway 41.

The chamber 72 houses a snap action mechanism 75, having a seal 76 which, with the snap action mechanism 75 in the position shown in FIG. 8, seals against the port 74. A push rod 77 bears against the mechanism 75, and projects through an aperture in the casing 71. The upper portion of the push rod 77 is enclosed within a rolling diaphragm 78, which serves to seal the push rod 77 and the aperture from the cavity beneath the diaphragm 34. A compression spring 79 is contained in the diaphragm 78, and acts between a flange in the connecting rod 79 and the casing 71 to exert an upward biassing force on the push rod 77.

The top of the push rod 77 is situated adjacent the underside of the diaphragm 34, and when a suitable pressure is applied through the port 25 to the chamber 29, the diaphragm 34 flexes, pushing the push rod 77 down against the action of the spring 79. As the push rod 77 passes a predetermined position, the snap action mechanism moves into an open position in which the seal 76 no longer bears against the port 76. This results in the chamber 72, and thus the chamber 40, being evacuated through the passageways 74 and 41 and port 26. Provided that a sufficient vacuum is being applied to the port 26, the control system will open the valve 6 in the same way as the first form of the control system described hereinbefore.

As the pressure in the port 25 drops, the spring 79 raises the push rod 77, causing the snap action mechanism to return to the position shown in FIG. 6.

In all other aspects, the valve control system shown in FIG. 8 is the same as the first form of the valve control system, and is connected, in use, to the rest of the temporary liquid storage and transportation system via correspondingly referenced passageways and ports.

The temporary liquid storage and transportation system may include a cycle counter which provides a record of the number of times that the vacuum interface valve 6 has been opened.

Figure 9:
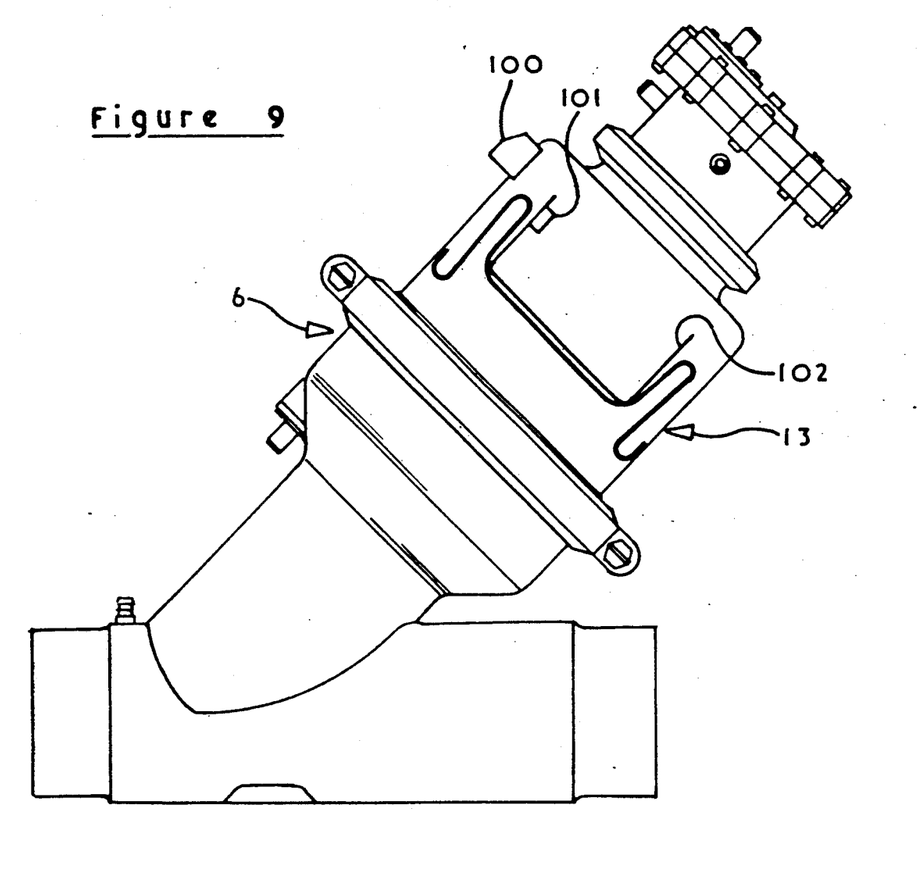
FIG. 9 shows a vacuum interface valve equipped with a cycle counter.

Referring to FIG. 9, such a counter may be a magnetically actuated counter 100, which is mounted on the casing of the interface valve 6. Each time the interface valve 6 opens, the counter 100 is advanced by a magnet 101 mounted on a piston 102 forming part of the rolling diaphragm operator 13.

The magnetically actuated counter is conveniently of a known kind, and may consist of an LCD counter connected to a reed switch. Two examples of suitable LCD counters are those sold under the trading style REDLION CONTROLS (and referenced CUB3L), and under the trading style HENGSTLER 706, respectively. These are resettable battery-operated counters that have two input terminals, and are so arranged that, when the two terminals are brought into electrical contact, the counter is advanced by one count. The counter may, therefore, be used in conjunction with a ferro-magnetic reed switch which is so positioned relative to the magnet that, each time the valve 6 opens, the reed switch brings the input terminals into electrical contact.

Alternatively, the counter 100 may be a mechanical magnetically actuated counter of the kind sold under the trading style COLIBRI, and manufactured by HENGSTLER GB Ltd. This counter is actuated by the magnet 101 on the piston 102.

I claim:

1. A valve control system for use in a temporary liquid storage and transportation system having a tank with a liquid inlet and an outlet connected to a vacuum source for withdrawal of liquid through an interface valve operable to be opened by air pressure produced when the liquid in the tank reaches a predetermined level therein, said control system including pressure responsive means comprising first and second chambers containing a first diaphragm disposed therebetween, an inlet port above said first diaphragm in said first chamber for connection to said air pressure produced when the liquid in said tank reaches a predetermined level therein, a bleed port from said first chamber to said second chamber, third and fourth chambers containing a second diaphragm disposed therebetween and spaced from said first and second chambers, said second diaphragm being operatively connected to actuate said interface valve to control flow through said tank outlet, a passageway from said second to said third chamber for passage of air therebetween, valve means operated by said first diaphragm to control flow through said passageway to control operation of said second diaphragm, said system being operable upon application of a substantially constant predetermined pressure through said inlet port to allow flow of air through said bleed port to apply pressure to and move said second diaphragm to actuate said interface valve, and on occurence of a surge of pressure into said inlet valve to move said valve means to close said passageway to prevent application of pressure to said second diaphragm and thus prevent operation of said interface valve.

2. A valve control system in accordance with claim 1 including manually operated means to operate said second diaphragm to open said valve means independently of said first diaphragm.

3. A valve control system in accordance with claim 2 in which said manually operated means comprises a push-plunger positioned to operate said second diaphragm to open said valve means independently of said first diaphragm.

4. A valve control system in accordance with claim 1 in which said bleed port is in said first diaphragm.

5. A control system in accordance with claim 1, in which said second and third chambers are physically adjacent and aligned and have a common wall in which said passageway is located, and said passageway is positioned to be physically blocked by said first diaphragm seating on, and sealing, the opening thereinto at one extreme of its range of movement, said first diaphragm and said passageway cooperating to provide said valve means.

6. A control system in accordance with claim 1, including
a plunger operated by said second diaphragn comprising at least a part of the operative connection to actuate said interface valve.

7. A control system in accordance with claim 1, in which
said interface valve is vacuum operated, and
the operative connection to actuate said interface valve comprises a control valve for controlling application of vacuum, and
a plunger operated by said second diaphragn to operate said control valve to actuate said interface valve.

8. A control system in accordance with claim 1, in which
said pressure responsive means has a stand-by configuration with said diaphragms in a position closing off admission of vacuum, and an activated position with said diaphragms moved to positions where said valve means is opened to admit vacuum,
said system has an opening for connection to a vacuum source and controlled by said valve means,
said system has an opening to atmosphere,
said opening to atmosphere being connected to supply atmospheric pressure below said second diaphragm during stand-by configuration, and
said valve means being operable to apply vacuum below said second diaphragm in said activated position to cause said second diaphragm to operate said interface valve.

9. A control system in accordance with claim 1, including
a plunger operated by said second diaphragn comprising at least a part of the operative connection to actuate said interface valve, and
said valve means comprises a flexible tubular member having a normally closed configuration and opened by lateral force applied thereto by said plunger.

10. A control system in accordance with claim 1, in which
said valve means comprises a snap action valve operated by movement of said second diaphragm to an open position for actuating said interface valve.

11. A control system in accordance with claim 1, including
a plunger operated by said second diaphragn comprising at least a part of the operative connection to actuate said interface valve, and
said valve means comprises a snap action valve operated by movement of said plunger to an open position for actuating said interface valve.

12. A valve control system connected to and controlling in a temporary liquid storage and transportation system in which
said temporary liquid storage and transportation system has a tank with a liquid inlet and an outlet,
a liquid supply line connected to said tank inlet,
means responsive to the level of liquid in said tank generating air pressure in response to the rise in liquid level therein,
an outlet conduit connected to said tank outlet for withdrawal of liquid therethrough,
an interface valve positioned in said outlet conduit for controlling flow of liquid therethrough,
a vacuum operated diaphragm in said interface valve operating a valve member for controlling flow of liquid therethrough,
means including said outlet conduit providing a vacuum source for withdrawal of liquid through said interface valve,
said control system including pressure responsive means comprising
first and second chambers containing a first diaphragm disposed therebetween,
an inlet port above said first diaphragm in said first chamber connected to said liquid level responsive means to receive air pressure produced when the liquid in said tank reaches a predetermined level therein,
a bleed port from said first chamber to said second chamber,
third and fourth chambers containing a second diaphragm disposed therebetween and spaced from said first and second chambers,
said second diaphragm being operatively connected to actuate said interface valve to control flow through said tank outlet,
a passageway from said second to said third chamber for passage of air therebetween,
valve means operated by said first diaphragm to control flow through said passageway to control operation of said second diaphragm,
a control valve positioned for operation by said second diaphragm to control application of vacuum from said outlet conduit to said vacuum operated diaphragm,
said system being operable upon application of a substantially constant predetermined pressure through said inlet port to allow flow of air through said bleed port to apply pressure to and move said second diaphragm to actuate said interface valve, and
on occurence of a surge of pressure into said inlet valve to move said valve means to close said passageway to prevent application of pressure to said second diaphragm and thus prevent operation of said interface valve.

13. A valve control system in accordance with claim 12, including
a plunger operated by said second diaphragn positioned to operate said control valve.

14. A valve control system in accordance with claim 12, in which
said pressure responsive means has a stand-by configuration with said diaphragms in a position closing off admission of vacuum, and an activated position with said diaphragms moved to positions where said control valve is opened to admit vacuum,
said system has an opening to atmosphere,
said opening to atmosphere being connected to supply atmospheric pressure below said second diaphragm during stand-by configuration, and
said control valve being operable to apply vacuum below said second diaphragm in said activated position to cause said second diaphragm to operate said interface valve.

15. A valve control system in accordance with claim 12 including
a plunger operated by said second diaphragn positioned to operate said control valve, and
said control valve comprises a flexible tubular member having a normally closed configuration and opened by lateral force applied thereto by said second diaphragm through said plunger.

16. A valve control system in accordance with claim 12, including
   a plunger operated by said second diaphragm positioned to operate said control valve, and
   said valve means comprises a snap action valve operated by movement of said second diaphragm through said plunger to an open position for actuating said interface valve.

17. A valve control system in accordance with claim 12 in which
   said control valve is of a type having a through-passageway body with a valve member mounted therewithin actuated by an across-valve pressure differential, the body being flexible such that under applied perpendicular force it deforms, whereby the valve member fails to seat properly and so becomes in effect open.

18. A valve control system in accordance with claim 12 including
   timer means to control how long said interface valve is kept open.

19. A valve control system in accordance with claim 12 including
   a magnet and of a magnetically actuated counter positioned in part on said vacuum operated diaphragm so that, as the interface valve operates, the magnet moves relative to the counter to advance the counter.

20. A valve control system in accordance with claim 19 in which
   said counter has two terminals which, in use, advance the counter by a count when brought into electrical contact; and a magnetic switch which is so arranged that, when the interface valve operates, the magnet moves the switch to bring the terminals into electrical contact.

* * * * *